(12) United States Patent
Rethaber

(10) Patent No.: US 11,006,575 B2
(45) Date of Patent: May 18, 2021

(54) ARRANGEMENT FOR FASTENING A CUTTING HEAD; PORTABLE WORK APPLIANCE HAVING AN ARRANGEMENT FOR FASTENING A CUTTING HEAD

(71) Applicant: Andreas Stihl AG & Co. KG, Waiblingen (DE)

(72) Inventor: Achim Rethaber, Fellbach (DE)

(73) Assignee: ANDREAS STIHL AG & CO. KG, Waiblingen (DE)

(*) Notice: Subject to any disclaimer, the term of this patent is extended or adjusted under 35 U.S.C. 154(b) by 0 days.

(21) Appl. No.: 16/396,270

(22) Filed: Apr. 26, 2019

(65) Prior Publication Data

US 2019/0327888 A1    Oct. 31, 2019

(30) Foreign Application Priority Data

Apr. 27, 2018  (EP) .................................. 18 169 970

(51) Int. Cl.
*A01D 34/90*  (2006.01)
*A01D 34/73*  (2006.01)
*A01D 34/416* (2006.01)
*A01D 34/84*  (2006.01)

(52) U.S. Cl.
CPC ......... *A01D 34/90* (2013.01); *A01D 34/4165* (2013.01); *A01D 34/733* (2013.01); *A01D 34/84* (2013.01)

(58) Field of Classification Search
CPC .... A01D 34/90; A01D 34/84; A01D 34/4165; A01D 34/733; A01D 34/736

USPC .......................................................... 30/276
See application file for complete search history.

(56) References Cited

U.S. PATENT DOCUMENTS

| | | | | |
|---|---|---|---|---|
| 4,047,299 A | * | 9/1977 | Bair | A01D 34/416 30/276 |
| 4,145,809 A | * | 3/1979 | Proulx | A01D 34/416 30/276 |
| 4,236,309 A | * | 12/1980 | Cayou | A01D 34/4163 30/276 |
| 4,412,382 A | | 11/1983 | White | |
| 6,023,847 A | * | 2/2000 | Niedl | A01D 34/416 30/276 |
| 7,111,403 B2 | * | 9/2006 | Moore | A01D 34/4166 30/276 |
| 8,573,323 B2 | * | 11/2013 | Muller | A01D 34/902 173/217 |
| 9,379,596 B2 | | 6/2016 | Kraetzig | |
| 9,918,428 B2 | * | 3/2018 | Yamaoka | A01D 34/4165 |
| 10,485,165 B2 | * | 11/2019 | Yuan | A01D 34/4165 |

(Continued)

FOREIGN PATENT DOCUMENTS

EP    2371202 A2    10/2011
EP    2641461 A1    9/2013

(Continued)

*Primary Examiner* — Hwei-Siu C Payer
(74) *Attorney, Agent, or Firm* — Lucas & Mercanti, LLP; Klaus P. Stoffel (57) ABSTRACT

An arrangement includes an output shaft, a cutting head, at least one cutting tool arranged on the cutting head, and a hood. The cutting head is mounted on the output shaft by a screw element held in a rotationally fixed manner on the cutting head. The hood is held on the output shaft in a rotationally fixed manner, and has ribs in the inner region, and a first grip region in the outer region.

18 Claims, 6 Drawing Sheets

(56) References Cited

U.S. PATENT DOCUMENTS

2017/0042086 A1* 2/2017 Rethaber ................ A01D 34/90
2018/0098492 A1 4/2018 Guo et al.
2019/0327888 A1* 10/2019 Rethaber .............. A01D 34/736

FOREIGN PATENT DOCUMENTS

| EP | 2653024 A1 | 10/2013 |
|---|---|---|
| EP | 2747542 A1 | 7/2014 |
| WO | 2008053508 A2 | 5/2008 |
| WO | 2013027089 A1 | 2/2013 |

* cited by examiner

ARRANGEMENT FOR FASTENING A CUTTING HEAD; PORTABLE WORK APPLIANCE HAVING AN ARRANGEMENT FOR FASTENING A CUTTING HEAD

CROSS-REFERENCE TO RELATED APPLICATIONS

The present application claims priority of EP 18 169 970.3, filed Apr. 27, 2018, the priority of this application is hereby claimed and these applications are incorporated herein by reference.

BACKGROUND OF THE INVENTION

The invention relates to an arrangement for fastening a cutting head on an output shaft. Further, the invention relates to a portable work appliance having an arrangement for fastening a cutting head.

Brushcutters are known, arranged on the output shaft of which is a cutting head having a cutting tool. The cutting head is mounted on the output shaft by means of a press-fit connection. A disadvantage of such brushcutters is that it is difficult for end users themselves to change the cutting head of the brushcutter. To demount and mount the cutting head, the end user needs a special tool in order to undo the press-fit connection, and then to mount the new cutting head on the output shaft again by means of a press-fit connection. Alternatively, the end user can bring the brushcutter into a corresponding specialist workshop that undertakes changing of the cutting head.

SUMMARY OF THE INVENTION

The invention is based on the object of creating an arrangement for fastening a cutting head to an output shaft of a motor-driven work appliance, that enables the cutting head to be mounted on, and demounted from, the work appliance in a simple and rapid manner without the use of tools.

This invention is furthermore based on the object of creating a portable work appliance having an arrangement for fastening a cutting head to an output shaft of a motor-driven work appliance, that enables the cutting head to be mounted on, and demounted from, the work appliance in a simple and rapid manner without the use of tools.

It is provided that the arrangement for fastening a cutting head to an output shaft of the motor-driven work appliance comprises an output shaft, a cutting head and at least one cutting tool arranged on the cutting head. The cutting head is mounted on the output shaft by means of a screw element held in a rotationally fixed manner on the cutting head, and in particular held on the output shaft by frictional force. For the purpose of mounting, the cutting head, together with the screw element inserted in a rotationally fixed manner therein, is rotated, in a mounting direction of rotation, onto the output shaft. The arrangement additionally comprises a hood. The hood is divided in the radial direction starting from the rotation axis, into an inner region and an outer region that adjoins the inner region. Accordingly, the distance of the outer region from the rotation axis is greater than the distance of the inner region from the rotation axis. A width of the inner region, measured radially in relation to the rotation axis, corresponds to at least 3 times a width of the outer region, measured radially in relation to the rotation axis. The hood is held against rotation preferably by positive engagement, preferably by frictional force, in particularly adhesive-bonded, preferably pressed, on the output shaft. The hood may also be held directly on the output shaft in a rotationally fixed manner by means of other types of fastening. The hood has ribs in the inner region, and a first grip surface in the outer region.

To demount the cutting head, the cutting head must be unscrewed from the output shaft. In order that the output shaft does not rotate concomitantly, and thus prevent the cutting head from being released, the output shaft must be held fast. Access to the output shaft, however, is blocked by the cutting head, the hood or also by the front housing of the work appliance, such that the output shaft cannot be held fast directly. The hood is carried on the output shaft. The hood is held by positive engagement against rotation on the output shaft. In addition, a relative rotation between the hood and the cutting head is possible. Thus, the output shaft can be indirectly held fast against rotation via the hood while the cutting head is being released from the output shaft.

In addition, there is a first grip surface provided on the housing. The first grip surface is arranged in the outer region of the housing, and is thus easily accessible. The housing preferably has an inner side that faces toward the cutting head, and an outer side that faces away from the cutting head. The first grip surface is preferably realized in the outer region, on the outer side of the hood. To demount or mount the cutting head, the operator must hold the hood fast with one hand at the first grip surface, and with the other hand twist the cutting head from the output shaft. The operator can thereby release the cutting head by hand, or fasten it to the output shaft, without requiring a tool for this purpose. Mounting and demounting of the output shaft are effected without the use of tools.

The ribs on the hood increase the stiffness of the hood, such that the holding force exerted by the operator, starting from the first grip surface, can also be transmitted, via the ribs, to the output shaft. In addition, deformation of the hood while it is being held fast can substantially be avoided.

The hood is preferably realized as a pot shape. The hood preferably has an inner side, the inner side delimiting an interior space. Advantageously, the cutting head is accommodated, at least partly, in the interior space. Owing to the pot-shaped design of the hood, it is delimited along its circumference and in its axial direction. The contour delimiting the hood may have a rectilinear and/or curved course. There may also be discontinuities in the course of the contour. The inner region and the outer region of the hood advantageously meet at the radial delimitation of the interior space.

The hood comprises a hood base that extends in the radial direction from the rotation axis, and a hood wall that adjoins the hood base. The outer region advantageously corresponds to the hood wall. The hood wall extends substantially in the direction of the rotation axis. However, the outer diameter of the hood wall may vary along the rotation axis. Accordingly, the hood wall is not fixed to a cylindrical contour, but may also have, in particular, a curved course. The hood wall is of a thickness that corresponds to the distance, measured in the radial direction in relation to the rotation axis, between the outer side and the inner side of the hood. The thickness of the hood wall is, in particular, less than 5% of the maximum diameter of the hood. Accordingly, the hood has a small wall thickness in relation to its extent. The hood may have a greater thickness directly adjacent to the output shaft. Owing to the pot-shaped design of the hood, the cutting head can be arranged, at least partly, in the hood. As a result, the cutting head is partly enveloped by the hood. Advantageously, the inner side of the hood forms a counter-contour to the outer side of the cutting head, such that the hood closely surrounds the cutting head.

The ribs are preferably realized only on the outer side of the hood. As a result, the cutting head can be positioned doser to the hood base, and a more compact arrangement of the hood and cutting head is made possible.

Preferably, on its inner side the hood has a bearing contact surface, via which the hood is tensioned on the output shaft. The cutting head is preferably tensioned with full surface contact against the bearing contact surface of the hood. The hood is thereby tensioned and fastened on the output shaft, in the axial direction of the rotation axis, by the cutting head. Advantageously, the bearing contact surface is realized on the inner side of the hood base, in the inner region of the hood. The hood has a length, measured in the direction of the rotation axis, the bearing contact surface preferably being arranged approximately at half of the length of the hood. In particular, owing to the bearing contact surface being realized close to the output shaft, a short, direct flow of force is ensured between the output shaft, cutting head and hood. The closed flow of force runs, starting from the output shaft, via the screw element, into the cutting head, via the contact bearing surface to the hood, via a support bearing and via a shaft shoulder back again into the output shaft.

When the cutting head is in the mounted state, the hood and the cutting head are tensioned to each other, in the direction of the rotation axis, via the bearing contact surface. Accordingly, the hood and the cutting head are connected to each other only by frictional force in the circumferential direction. Upon release of the cutting head, the hood and the cutting head can rotate relative to each other in the circumferential direction, in relation to the rotation axis. Thus, when the hood is held fast, the cutting head can be released from the output shaft and tensioned on it.

The inner side of the hood and the cutting head, in particular the outer side of the cutting head, contact each other in a sealing manner, preferably in a sealing surface. The sealing surface is preferably at a distance from the rotation axis that corresponds to at least one quarter of the outer diameter of the hood. Owing to the sealing surface between the hood and the cutting head, the ingress of dirt, between the cutting head and the hood, during operation of the work appliance is avoided. As a result, in particular the bearing contact surface for tensioning the hood and the cutting head remains free of dirt, such that a reliable transmission of tensioning forces can be ensured.

The hood is preferably realized as a fan wheel. The fan wheel may be used to cool the motor of the work appliance. The hood may advantageously also be used as a blower fan for generating an airflow against accretion of dirt on the front housing. Thus, air is blown out by the blower wheel between the front housing and the cutting head, and ingress of dirt into the transmission interior is avoided. The grasses that are swirled upward, for example, in the case of a brushcutter are blown radially outward by the airflow of the blower wheel even before they reach the front housing. Preferably, two defined locations are provided at which the air blows from the blower wheel in the direction of a guard. The guard is a constituent part of the front housing. As a result, the front housing remains free of dirt accretion.

It Is advantageously provided that the hood comprises a hub that is arranged in a rotationally fixed manner on the hood, the hub producing a positive-engagement connection between the hood and the output shaft. As a result of the hub being realized separately, it can be made of a material different from that of the hood, in particular of a material having a greater strength and lesser wear, in particular a metal alloy. As a result, comparatively high driving torques can be transmitted from the output shaft to the hood, without damaging the hood. The hood itself, in turn, may be composed of a less strong, but therefore lighter, material, to save weight. The hood is arranged in a rotationally fixed manner on the hub, and the hub is connected by positive engagement to the output shaft. Via the hub, therefore, the output shaft can be held fast in the circumferential direction of the rotation axis by means of the hood.

The first grip surface of the hood preferably overlaps the cutting head in the direction of the rotation axis. Preferably, the first grip surface overlaps the cutting head in the direction of the rotation axis in its entire length, measured in the direction of the rotation axis. The first grip surface of the hood is therefore rendered more accessible to the operator. The operator can achieve a better grip on the hood, and can more easily manually apply the counter-torque, necessary for releasing or chucking the cutting head, to the hood. Since the available structural height of the cutting head is used to provide the grip surface, the structural height is not increased, or is increased only slightly, because of the grip surface. Since the grip surface covers the cutting head axially, the grip surface is then also freely accessible when the cutting head and the front housing directly adjoin each other in the axial direction.

The hood preferably, along the first grip surface, has clearance in relation to the cutting head, in the radial direction starting from the rotation axis. When the hood is being held at the first grip surface, and possibly even when the first grip surface is being slightly pressed-in in the direction of the cutting head, the clearance avoids the cutting head being contacted by the hood. Contact between the hood, at the first grip surface, and the cutting head would result in the cutting head also being held fast by the hood. The mutual rotation of the hood and cutting head would thus be rendered more difficult. Owing to the clearance between the hood and the cutting head, it can be ensured that the hood, at the first grip surface, and the cutting head do not mutually obstruct each other during mounting or demounting.

The first grip surface of the hood and a second grip surface, which is realized on the cutting head, are preferably freely accessible. Accordingly, the operator, when mounting or demounting the cutting head, can easily hold the cutting head fast with one hand at the second grip surface, and with the other hand hold the hood fast at the first grip surface, and rotate them against each other. Owing to the ease of accessibility, with the hood being held fast the cutting head can be unscrewed and demounted from the output shaft by hand, without the use of further tools.

The portable work appliance comprises the arrangement according to the invention and a front housing. It is provided that the hood projects, with its outer region, advantageously completely, out of the front housing. It is thereby ensured that the grip surface located in the outer region is freely accessible, and is not covered by the front housing. Consequently, the operator can manually grip the hood. Advantageously, the ribs arranged in the inner region overlap axially with the front housing. Advantageously, the front housing projects over the ribs of the hood in the direction of the rotation axis, in particular completely. The gap between the front housing and the hood is thereby reduced. The transmission interior space is protected against accretion of dirt. In addition, due to the overlapping of the ribs, the fan power, and consequently the cooling power, is increased.

Advantageously, both the grip surface and the ribs are arranged on the outer side of the hood, such that the cutting head can bear against the inner side of the hood.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
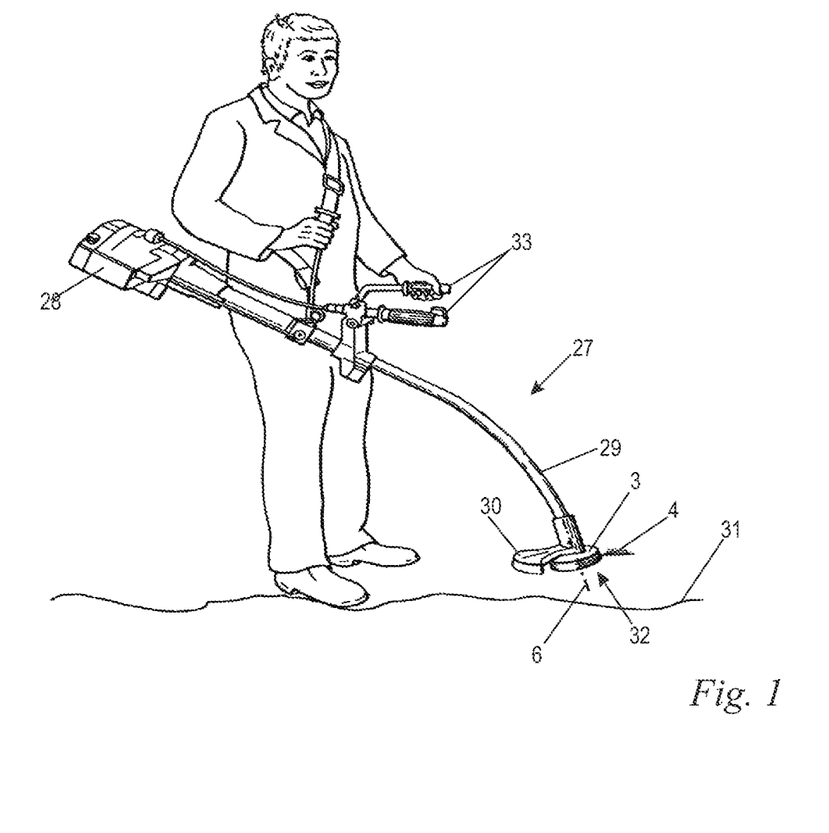
FIG. 1 a schematic representation of a brushcutter, held by an operator.

Shown schematically in FIG. 1 is a portable work appliance, which in the exemplary embodiment is embodied as a brushcutter. Other embodiments of the portable work appliance 27 may also be expedient. The portable work appliance 27 is held by an operator. The work appliance 27 has a rear end, having a rear housing 28, and a front end, having a front housing 2, from which an output shaft 5 projects. A stem 29 connects the rear end and front end. Arranged on the stem 29 are handles 33 for guiding the work appliance 26. Adjoining the front end of the work appliance 26 is a cutting head 3. The cutting head 3 is fastened to the output shaft 5, and is driven in rotation about a rotation axis 6 by a drive motor, not shown. The drive motor is, in particular, an electric motor, which is arranged in the front housing 2. Advantageously, there is also a transmission in the front housing 2. However, an arrangement in which the drive motor is arranged in the rear housing 28, and a drive shaft 5 extends in the stem 29, may also be expedient. It may also be provided that the drive shaft transitions into the output shaft 5, and accordingly there is no intermediately connected transmission. On the side that, during operation, faces toward the operator, the cutting head 3 is covered by a protective hood 30. The cutting head 3 has at least one cutting tool 4, which serves to cut clippings such as grass, undergrowth or the like. Realized on the cutting head 3 is an underside 32, which during operation faces toward the ground 31 and which is arranged on the side of the cutting head 3 that faces away from the stem 29. The protective clothing that must necessarily be worn by the operator for operating a work appliance 27 is not shown in the simplified representation of FIG. 1.

Figure 2:
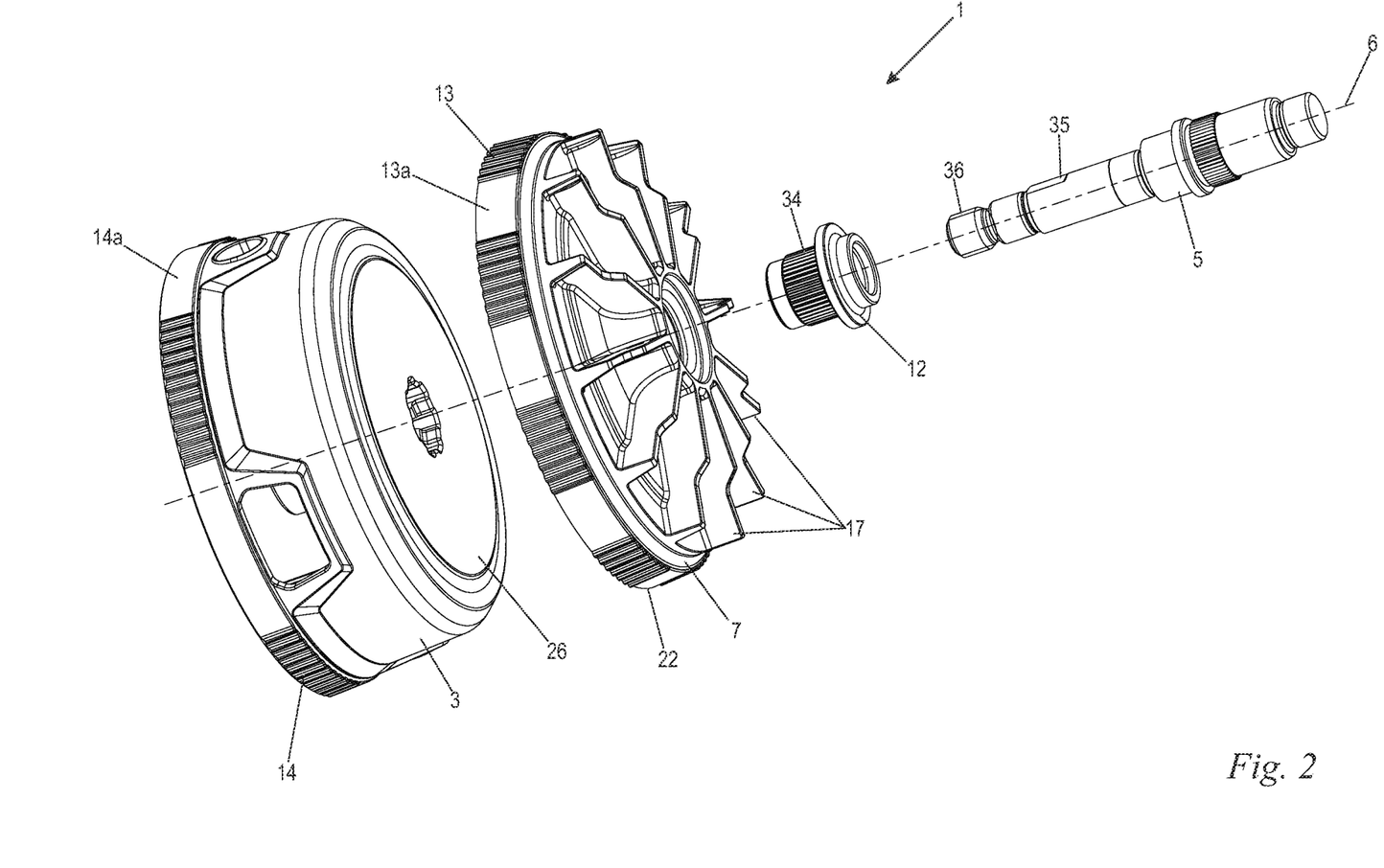
FIG. 2 a perspective exploded representation of a first exemplary embodiment of the cutting head, the hood, with hub, and the output shaft, FIG. 3 a sectional representation of the front housing, and of a second exemplary embodiment of the arrangement according to the invention, FIG. 4 a sectional representation of the hood, FIG. 5 a representation of a detail from FIG. 3, according to the detail I, FIG. 6 a perspective representation of the hood, FIG. 7 a side view of an exemplary embodiment of the arrangement according to the invention, FIG. 8 a sectional representation of the arrangement according to the invention from FIG. 7, and FIG. 9 a detail representation of a work appliance, with stem and arrangement according to the invention.

Shown in FIG. 2 is an exploded representation of a first exemplary embodiment of the arrangement according to the invention. The arrangement 1 for fastening a cutting head to an output shaft of a work appliance comprises an output shaft 5, a hood 7, having a hub 12, and a cutting head 3.

As shown in FIG. 2, the output shaft 5 has a dihedron 35. When the arrangement 1 is in the mounted state, the hub 12 of the hood 7 is pushed onto the output shaft 5 and, by means of the dihedron 35, is held with positive engagement, against rotation about the rotation axis 6, on the output shaft 5. Other connections, between the hub 12 and the output shaft 5, that result in a rotationally fixed connection between the hub 7 and the output shaft 5 may also be expedient. The connection may also expediently be realized as a frictional or materially bonded connection. Examples for a corresponding connection are adhesive bonding, press-fit, parallel-key connection, connection by means of set screw. However, the rotationally fixed connection between the output shaft 5 and the hood 7 must always be configured so as to be independent of the connection of the cutting head 3 to the output shaft 5. In particular, no application of force such as, for example, a squeezing or pressing action, on the cutting head 3 is required for connecting the output shaft 5 and the hood 7 in a rotationally fixed manner. In the exemplary embodiment, it is sufficient that the hood is positioned, in the direction of the rotation axis 6, in a region of the output shaft 5 in which there is positive engagement between the output shaft 5 and the hood 7. A rotationally fixed connection of the output shaft 5 and the hood 7—independently of the cutting head 3—is then already possible. The hub 12 has a toothing 34, on which the hood 7 is arranged. The hood 7 is connected to its hub 12, by means of the toothing 34, by positive engagement in the circumferential direction of the rotation axis 6, and is held, secured against rotation, on the output shaft 5. The hood 7 is held in a rotationally fixed manner in the direction about the rotation axis 6. Other connections between the hub 12 and the hood 7, such as, for example, frictional or materially bonded connections, may also be expedient. At its end that faces toward the ground 31 (FIG. 1), the output shaft 5 has a thread 36. The cutting head 3 is screwed onto the thread 36 of the output shaft 5 via a screw element 8 (FIG. 3) that is fastened, secured against rotation, in the cutting head 3. In the exemplary embodiment, inserted in the cutting head 3 there is a screw element 8 that, together with the cutting head 3, is screwed onto the thread 36 of the output shaft 5. In the exemplary embodiment, the screw element 8 is realized as a threaded nut. The screw element 8 is held on the cutting head 3 in a rotationally fixed manner, in such a manner that a rotation of the cutting head 3 causes a rotation of the screw element 8. Also, a rotation of the screw element 8 causes a rotation of the cutting head 3. The screw element 8 and the hood 7 can be rotated against each other about the rotation axis 6. The screw element 8, together with the cutting head 3, can be rotated with respect to the output shaft 5, in the direction about the rotation axis 6. The cutting head 3, the hood 7 with its hub 12, and the output shaft 5 are arranged coaxially with the rotation axis 6. In addition, on its outer side 22 the hood 7 has first grip surfaces 13, 13a and ribs 17. The cutting head 3, on its outer side 26, has second grip surfaces 14, 14a. The first, fluted grip surfaces 13 of the hood 7 have a fluting. The first, smooth grip surfaces 13a are smooth. In the exemplary embodiment, both first, fluted grip surfaces 13 and first, smooth grip surfaces 13a are provided. It may also be provided that exclusively first, smooth grip surfaces of the hood are provided. A single first, smooth grip surface, extending around the outer circumference of the hood, may also be provided. The second, fluted grip surfaces 14 of the cutting head 3 have a fluting. The second, smooth grip surfaces 14*a* of the cutting head 3 are smooth. In the exemplary embodiment, both first, fluted grip surfaces 14 and second, smooth grip surfaces 14*a* are provided. It may also be provided that exclusively second, smooth grip surfaces of the cutting head are provided. A single second, smooth grip surface, extending around the outer circumference of the cutting head, may also be provided.

Figure 3:
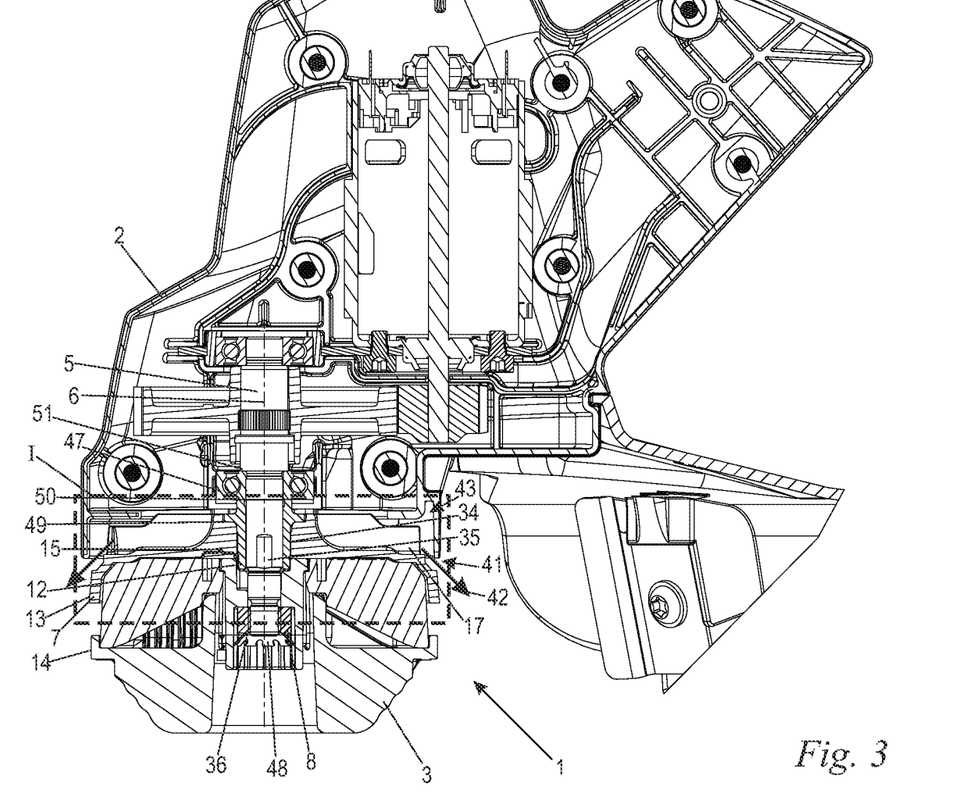

As can be seen in FIG. 3, radial access to the output shaft 5 is blocked, both in the case of mounting and in the case of demounting of the cutting head. It is not possible for the operator directly to hold the output shaft fast by hand in order to prevent it from rotating concomitantly as a result of the screwing motion. The following steps therefore ensure for mounting and demounting the cutting head 3:

To mount the cutting head 3 onto the output shaft 5, the cutting head 3 has to be screwed onto the thread 36 of the output shaft 5 by means of the screw element 8. In order that the output shaft 5 does not rotate concomitantly as the cutting head 3 is being mounted, the output shaft 5 has to be held fast, via the hood 7, at the grip surfaces 13, 13*a*. In this case, the holding force of the operator is transmitted from the grip surface 13, 13*a*, via the hood 7, onto the hub 12, to the output shaft 5. The output shaft 5 can thus be held fast via the grip surfaces 13, 13*a* on the hood 7 while the cutting head 3 is being held at the second grip surfaces 14, 14*a* and is being screwed onto the thread 36 of the output shaft 5. The cutting head 3 in this case comes to bear, with its outer side 26, against the hood 7, in the direction of the rotation axis 6. Via its hub 12, the hood 7 is supported, in the direction of the rotation axis 6, on a support bearing 47 (FIG. 3) that is fastened on the output shaft 5. As a result of the output shaft 5 being held fast via the hood 7, the cutting head 3 can be screwed onto the output shaft 5 by hand with a sufficiently high tightening moment.

To demount the cutting head 3, the operator can hold fast the hood 7 with one hand, at the first grip surfaces 13, 13*a*, and thus block the output shaft 5 in the direction of rotation. At the same time, with the other hand, the operator can grip the cutting head 3 at its second grip surfaces 14, 14*a*, and unscrew the cutting head 3 from the thread 36 of the output shaft 5, without concomitantly rotating the output shaft 5. The tool head 3 can thus be mounted or demounted by hand, without the use of tools, without the output shaft 5 being directly accessible to the operator.

Shown in FIG. 3 is the second exemplary embodiment of the arrangement according to the invention, of the cutting head 3, the hood 7 and the output shaft 5, mounted in the front housing 2 of a work appliance according to the invention.

The output shaft 5 is rotatably mounted in the front housing 2. A transmission and/or a drive motor may be arranged in the front housing 2, such that the front housing 2 is expediently realized as a transmission housing or as a motor housing.

As shown in FIG. 3, the cutting head 3 comprises the screw element 8, which is fastened in a rotationally fixed manner to the cutting head 3. In the exemplary embodiment, the screw element 8 is secured, by means of a toothed lock washer 48, against axial separation from the cutting head 3. The screw element 8 may also be an insert that is inseparably accommodated in the cutting head 3. The cutting head 3 is screwed onto the thread 36 of the output shaft 5 via the screw element 8. The cutting head 3 is supported axially via a bearing contact surface 15 of the hood 7. The tensioning force between the cutting head 3 and the hood 7 is transmitted substantially via the bearing contact surface 15. The hood 7 is arranged on the hub 12 and is supported against it, in the direction of the rotation axis 6, in a first contact surface 49. The hub 12, in turn, is tensioned against a support bearing 47, which is arranged on the output shaft 5 and which strikes against a shaft shoulder 51 in the direction of the rotation axis 6. The hub 12 contacts the support bearing 47, in the inner bearing shell thereof, in a second contact surface 50. Accordingly, a closed flow of force is ensured, starting from the screw element 8 of the cutting head 3, in the direction of the rotation axis 6, via the hood 7 and the hub 12, as far as the output shaft 5.

As shown by FIG. 3, the moments acting upon the output shaft 5 at the hood 7 are transmitted via the hub 12. The toothing 34 of the hub 12 connects the hub 12 to the hood 7 by positive engagement, in the circumferential direction of the rotation axis 6. The hub 12 is held on the output shaft 5, by positive engagement in the circumferential direction of the rotation axis 6, by the dihedron realized on the output shaft 5.

As shown in FIG. 3, the front housing 2 projects with its circumferential wall over the hood 7, in particular the ribs 17 of the hood 7, in the direction of the rotation axis 6. In addition, however, the hood 7 projects with its first grip surfaces 13, 13*a*, at least partly, out of the front housing 2, in the direction of the rotation axis 6. The grip surfaces 13, 13*a* are thus accessible to the operator. Further, the front housing 2 and the hood 7 delimit an annular gap 41. Owing to the ribs 17 of the hood 7, when the work appliance 27 is in operation an airflow 42 is generated, which blows outward into the environment, via the annular gap 41, from a transmission interior space 43 that is enclosed by the front housing 2. Accordingly, the annular gap 41 forms a gap seal that prevents the ingress of dirt into the transmission interior space 43.

Figure 4:
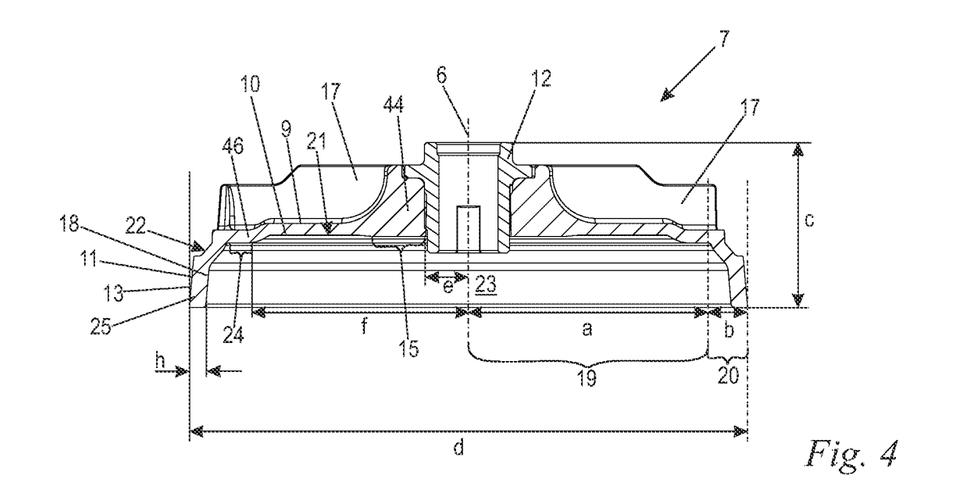
Figure 5:
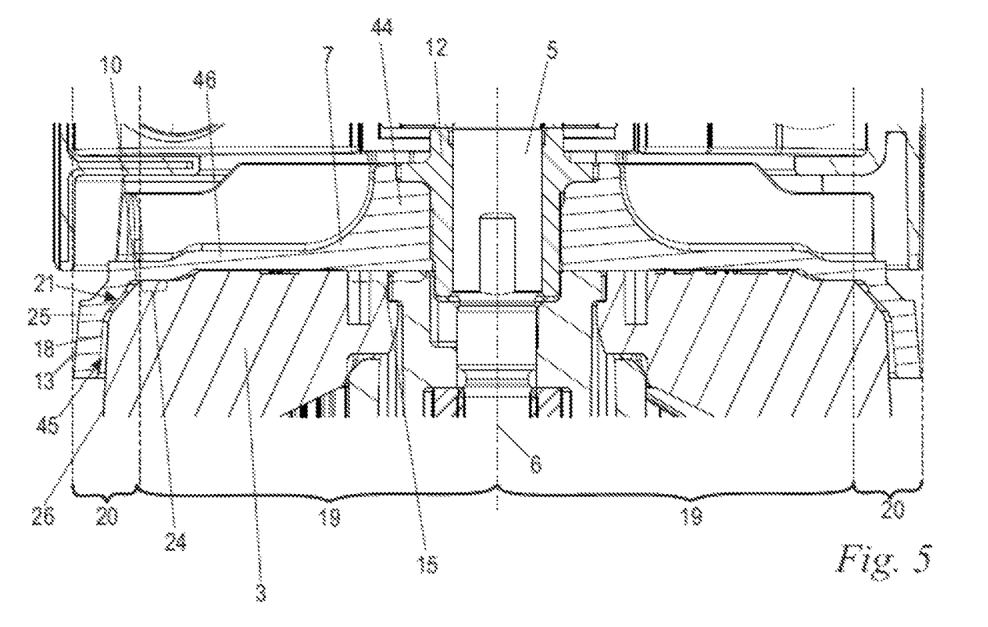

In FIG. 4, the hood 7, with its hub 12, is shown in a sectional representation. In the exemplary embodiment, the hood 7 is realized as a pot shape. The shape of the hood 7 advantageously follows the outer contour of the region of the cutting head 3 that is covered by the hood. In the exemplary embodiment, the cutting head 3 has a substantially cylindrical form. The hood 7 comprises a hood base 46, extending in the radial direction from the rotation axis 6, and a hood wall 25 that adjoins the hood base 46. The hood wall 25 extends in the direction of the rotation axis 6. The hood 7 has an inner side 21 that faces toward the cutting head 3, and an outer side 22 that faces away from the cutting head 3 (FIG. 5). The inner side 21 delimits an interior space 23 of the hood 7. In the exemplary embodiment, the inner side 21 is divided into an underside 10 at the hood base 46, and a circumferential inner side 18 at the hood wall 25. The outer side 22 of the hood 7 is divided into an upper side 9 at the hood base 46, and a circumferential outer side 11 at the hood wall 25. The hood 7 has an outer diameter d with regard to the circumferential outer side 11. In the exemplary embodiment, the outer diameter d Increases slightly, starting from the hood base 46, in the direction of the rotation axis 6. Nevertheless, in the exemplary embodiment the hood wall 46 has a substantially cylindrical contour course. The cutting head 3 may have, for example, a spherical form. The pot-shaped hood 7 advantageously also follows there the outer contour of the region of the cutting head 3 that is covered by the hood, such that the hood base 46 and the hood wall 25 have a curved course. At the hood wall 46 the hood 7 has a thickness h, which corresponds to the distance between the circumferential outer side 11 and the circumferential inner side 18. The thickness h of the hood wall 46 preferably corresponds to less than 5% of the maximum outer diameter d of the hood 7.

As shown in FIG. 4, the hood 7, starting from the rotation axis 6, is divided in the radial direction into an inner region 19 and an outer region 20 that adjoins the inner region 19. The inner region 19 has a width a, which corresponds to the distance, measured radially in relation to the rotation axis 6, between the outer region 20 and the rotation axis 6. The outer region 20 has a width b, which corresponds to the distance, measured radially in relation to the rotation axis 6, between the circumferential outer side 11 and the inner region 19. In the exemplary embodiment, the width a of the inner region corresponds to at least 3 times, in particular at least 5 times, preferably approximately 6 times, the width b of the outer region 20. The inner region 19 preferably extends from the rotation axis 6 as far as the circumferential inner side 18 of the hood wall 25. The outer region 20 preferably extends from the circumferential inner side 18 to the circumferential outer side 11 of the hood wall 25.

As shown in FIG. 4, the bearing contact surface 15 is realized on the inner side 21 of the hood 7. In the exemplary embodiment, the bearing contact surface 15 is realized on the underside 10 of the hood base 46, adjacently to the hub 12, and is at a distance e from the rotation axis 6. The bearing contact surface 15 is, in particular, an annular surface. The bearing contact surface 15 is perpendicular to the rotation axis 6, but in an alternative exemplary embodiment may also be oriented obliquely in relation to the rotation axis 6. The bearing contact surface 15 is arranged at approximately half the length c of the hood 7. The length c of the hood 7 is measured in the direction of the rotation axis 6. Further, there is a sealing surface 24 realized on the inner side 21 of the hood 7. The sealing surface 24 is realized on the underside 10 of the hood base 46, adjacently to the hood wall 25. The sealing surface 24 is, in particular, an annular surface. In the exemplary embodiment, the sealing surface 24 is arranged perpendicularly in relation to the rotation axis 6. In an alternative exemplary embodiment, the sealing surface 24 may also be oriented obliquely or parallel to the rotation axis 6. The sealing surface 24 is at a distance f from the rotation axis 6, which corresponds to at least 4 times, in particular approximately 5 times, the distance e between the bearing contact surface 15 and the rotation axis 6. In addition, the distance f of the sealing surface 24 corresponds to at least one quarter, in particular at least one third, of the outer diameter d of the hood 7.

As shown in FIG. 5, the bearing contact surface 15 of the hood 7 serves as a contact surface for the cutting head 3, for tensioning the cutting head 3 to the hood 7. The cutting head 3 is tensioned with full surface contact against the bearing contact surface 15 of the hood 7. Realized on the bearing contact surface 15 of the hood 7, to enable the tensioning forces to be taken up, there is an elongation 44 that extends in the direction of the rotation axis 6. In the region of the elongation the hood 7 is preferably realized by ribbings. It is thereby ensured that the hood 7 has a sufficiently high strength in the region of the main flow of force between the cutting head 3 and the hood 7. In addition, the outer side 26 of the cutting head 3 and the inner side 21 of the hood 7 contact each other at the sealing surface 24 of the hood 7, and thus form a seal against dirt. Since the sealing surface 24 is arranged adjacently to the hood wall 25, and thus radially outside the bearing contact surface 15, accretion of dirt on the bearing contact surface 15, between the hood 7 and the cutting head 3, is avoided. Both the sealing surface 24 and the bearing contact surface 15 are arranged in the inner region 19.

As shown in FIG. 5, the hood 7, on its inner side 21, does not contact the cutting head 3 in the outer region 20 of the hood 7. In the outer region 20 of the hood 7, the hood 7 and the cutting head 3 have a clearance 45 extending in the radial direction of the rotation axis 6. The clearance 45 is formed by a distance between the circumferential inner side 18 of the hood wall 25 and the outer side 26 of the cutting head 3. In the exemplary embodiment, the clearance extends in the direction of the rotation axis 6, and runs along the entire hood wall 25, in particular along the first grip surface 13, 13a, as far as the underside 10 of the hood base 46. This avoids the hood 7 being pressed onto the cutting head 3 in the region of the first grip surface 13, 13a during mounting or demounting of the cutting head 3, and thus interfering with the releasing or fastening of the cutting head 3.

Figure 6:
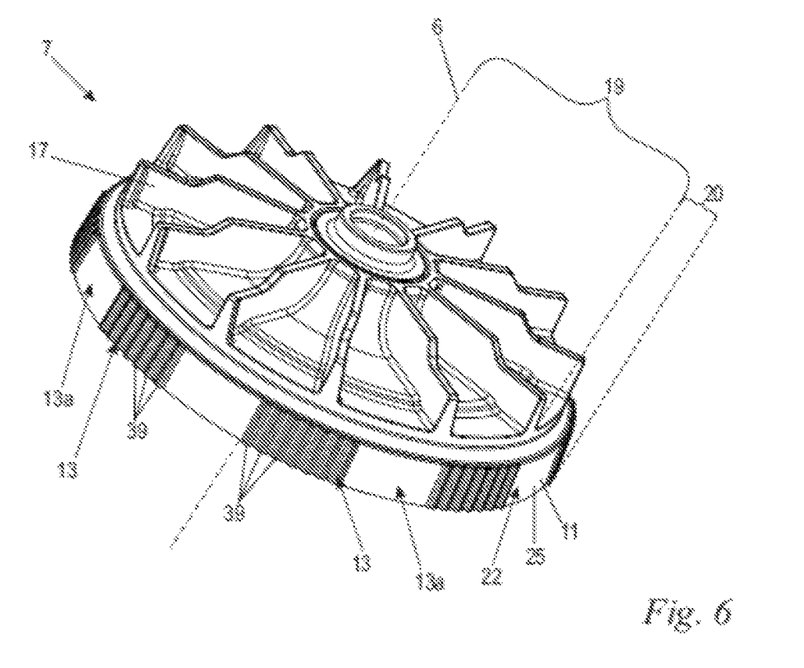

In FIG. 6 the hood 7 is represented in a perspective top view. There are ribs 17 realized on the outer side 22 of the hood 7. The ribs 17 run in the radial direction of the rotation axis 6, and extend in the direction of the rotation axis 6. In the exemplary embodiment, the ribs 17 are realized only on the upper side 9 of the hood base 46. On the upper side 9, the ribs 17 run through the inner region 19, and project into the outer region 20. The ribs 17 may expediently be realized only in the inner region 19 of the hood 7. In a preferred exemplary embodiment, the ribs 17 may expediently run from the upper side 9 as far as the circumferential outer side 11 of the hood wall 25. In an alternative exemplary embodiment, the ribs 17 may also expediently be realized on the inner side 21 of the hood 7. The ribs 17 are arranged, in particular in a star formation, around the rotation axis 6. The ribs 17 may also be arranged in the form of an arc in relation to the rotation axis 6. The sealing surface 24 lies in the form of a ring around the rotation axis 6.

In the exemplary embodiment, the ribs 17 and the sealing surface 24 are arranged on opposite sides of the hood 7. The ribs 17 serve to stiffen the hood 7, such that deformation of the hood 7 is avoided when the hood 7 is gripped. Upon rotation of the hood 7, the ribs 17 of the hood 7 generate an airflow, such that the hood 7 can be used, for example, as a fan wheel or as a blower wheel. In the exemplary embodiment, the hood 7 is realized as a fan wheel.

As shown in FIG. 6, there are first grip surfaces 13, 13a realized on the hood 7. The first grip surfaces 13, 13a are realized in the outer region 20, on the outer side 22 of the hood 7. In the exemplary embodiment, the first grip surfaces 13, 13a are realized on the circumferential outer side 11 of the hood wall 25. In the exemplary embodiment, the first, fluted grip surfaces 13 of the hood 7 are uniformly spaced apart from each other, in the circumferential direction of the rotation axis 6, on the circumferential outer side 11 of the hood 7. A non-uniform arrangement of the first, fluted grip surfaces 13 or a single first, fluted grip surface 13 along the entire circumferential outer side 11 may also be expedient. The first, fluted grip surface 13 has a fluting structure that is composed of individual fluting elements 39. The fluting elements 39 run approximately in the direction of the rotation axis 6. As a result, when the hood 7 is held fast at the first, fluted grip surfaces 13, a particularly good transmission of force is obtained in the circumferential direction of the rotation axis 6.

Figure 7:
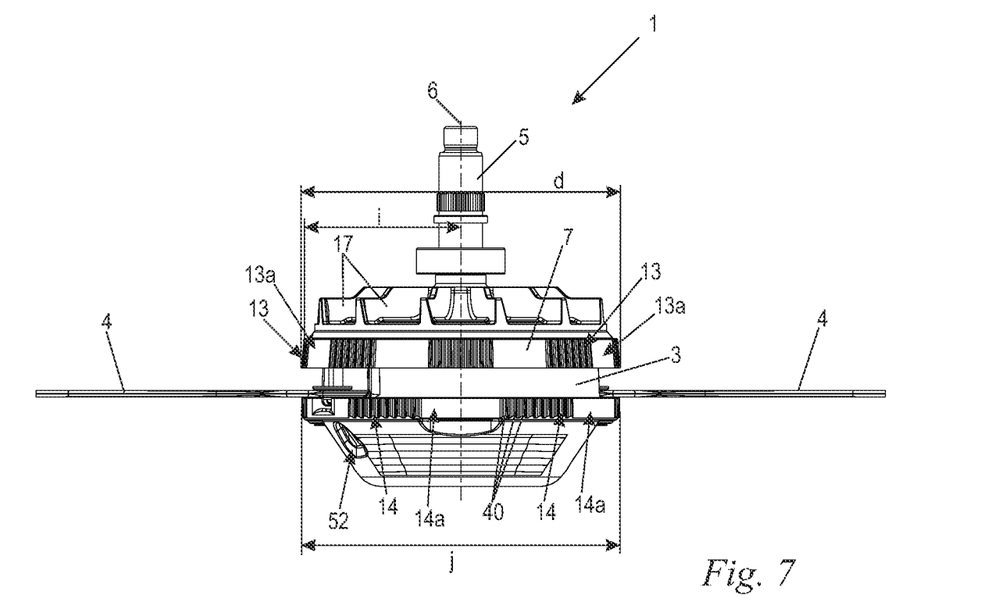

As shown in FIG. 7, there are two grip surfaces 14, 14a realized on the outer side 26 of the cutting head 3. The second, fluted grip surfaces 14 are uniformly spaced apart from each other, on the outer side 26 of the cutting head 3, in the circumferential direction of the rotation axis 6. It may also be expedient to provide a non-uniform arrangement of the second, fluted grip surfaces 14, or only a single second, fluted grip surface 14, on the outer side 26 of the cutting head 3. The second, fluted grip surface 14 of the cutting head 3 has fluting elements 40, running approximately in the direction of the rotation axis 6, which assist a transmission of force when the cutting head 3 is held at the second, fluted grip surfaces 14. Both the first grip surface 13, 13a of the hood 7 and the second grip surface 14, 14a of the cutting head 3 may expediently have other grip structures. Both the first grip surface 13, 13a of the hood 7 and the second grip surface 14, 14a of the cutting head are freely accessible to the operator.

As shown in FIG. 7, the grip surface 13, 13a is at a distance i from the rotation axis 6, which distance corresponds to at least 30%, in particular at least 35%, of the maximum outer diameter j of the cutting head 3. The maximum outer diameter d of the hood 7 corresponds to not more than 120%, in particular not more than 110%, of the maximum outer diameter j of the cutting head 3.

Figure 8:
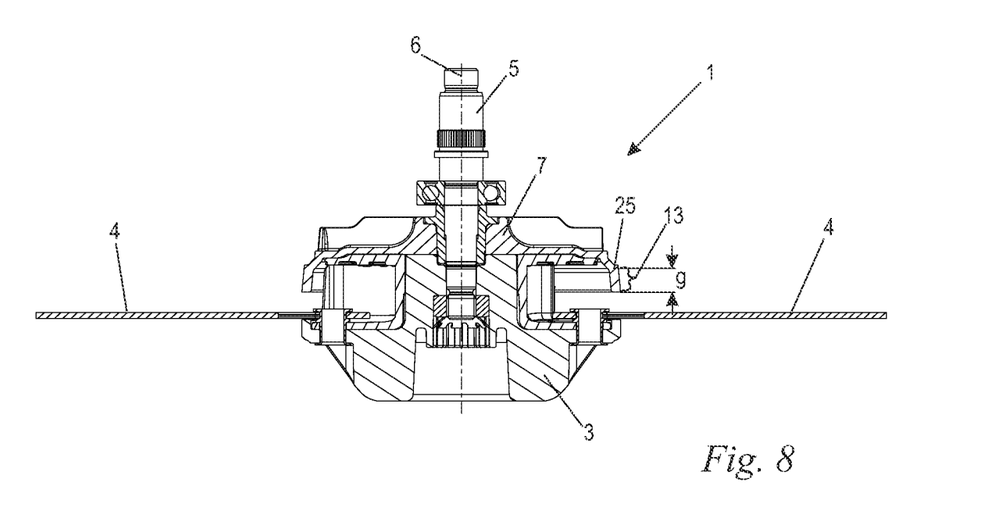

As shown in FIG. 8, the first grip surface 13, 13a has a length g, measured in the direction of the rotation axis 6. The cutting head 3 is arranged in the interior 23 of the hood 7, such that the hood 7 at least partly envelopes the cutting head 3. The hood 7 in this case projects over the cutting head 3, in the direction of the rotation axis 6, to such an extent that the hood 7 overlaps the cutting head 3 with the entire length g of the first grip surface 13, 13a.

As shown in FIGS. 7 and 8, cutting tools 4 are mounted on the cutting head 3. It may be expedient for only one cutting tool 4, or also a plurality of cutting tools 4, to be fastened to the cutting head 3.

In the exemplary embodiment, the cutting tools 4 are realized as cutting blades. Additionally provided on the cutting head are fastening devices 52 for fastening a cutting cord. Thus, when the cutting head 3 is in operation, cutting blades and/or cutting cords may be used as a cutting tool.

Common to the cutting heads 3 in the exemplary embodiments in FIGS. 2 and 3 is that they are each unscrewed as a unit from the output shaft 5. Although the cutting head 3 may be composed of a plurality of parts, they are not moved relative to each other in order to demount the cutting head 3 from the output shaft 5.

Figure 9:
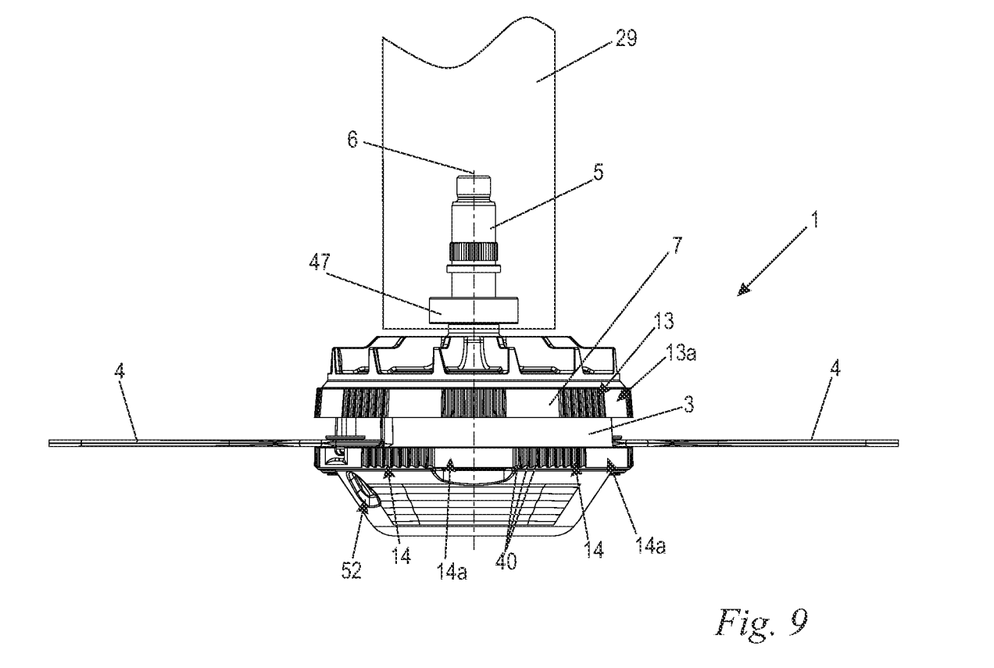

Shown in FIG. 9 is a detail representation of an exemplary embodiment of a work appliance 27, in which the arrangement 1 according to the invention is arranged directly on the stem 29. Accordingly, the cutting head 3 is coupled to the stem 29, not via a front housing 2, but directly. The output shaft 5 is mounted in the stem 29 via the support bearing 47. The drive shaft, not represented, transitions directly into the output shaft 5. Arranged on the output shaft 5, according to the invention, are the hood 7 and the cutting head 3.

While specific embodiments of the invention have been shown and described in detail to illustrate the inventive principles, it will be understood that the invention may be embodied otherwise without departing from such principles.

I claim:

1. An arrangement comprising: an output shaft; a cutting head; at least one cutting tool arranged on the cutting head; a screw element held in a rotationally fixed manner on the cutting head, wherein the screw element is adapted to be held on the cutting head even in a state of the cutting head that is released from the output shaft, wherein the cutting head is mounted on the output shaft by the screw element; and a hood, the cutting head and the hood, during operation, being driven in rotation about a rotation axis, the hood being divided in a radial direction starting from the rotation axis into an inner region and an outer region that adjoins the inner region, wherein the inner region has a width, measured radially in relation to the rotation axis, corresponding to at least 3 times a width of the outer region, measured radially in relation to the rotation axis, wherein the hood is formed separately from the cutting head, wherein the hood is held directly on the output shaft in a rotationally fixed manner, wherein the output shaft is configured to hold the hood even when the cutting head is dismantled, and wherein the hood has ribs in the inner region and a first grip surface in the outer region.

2. The arrangement according to claim 1, wherein the hood has a pot shape.

3. The arrangement according to claim 1, wherein the hood has an inner side that delimits an interior space, the cutting head being accommodated, at least partly, in the interior space.

4. The arrangement according to claim 3, wherein the hood has an outer side opposite the inner side, wherein the ribs are only on the outer side of the hood.

5. The arrangement according to claim 3, wherein the hood has a bearing contact surface on the inner side, wherein the bearing contact surface is configured and arranged to tension the hood on the output shaft.

6. The arrangement according to claim 5, wherein the cutting head is in a full surface contact with the bearing contact surface of the hood.

7. The arrangement according to claim 5, wherein the hood has a length, measured in a direction of the rotation axis, and the bearing contact surface is arranged approximately at half of the length of the hood.

8. The arrangement according to claim 3, wherein the inner side of the hood and the cutting head contact each other in a sealing manner at a sealing surface on the inner side of the hood.

9. The arrangement according to claim 1, wherein the hood is a fan wheel.

10. The arrangement according to claim 1, wherein the hood comprises a hub arranged in a rotationally fixed manner on the hood, wherein the hub provides a positive-engagement connection between the hood and the output shaft.

11. The arrangement according to claim 1, wherein the first grip surface overlaps the cutting head in a direction of the rotation axis.

12. The arrangement according to claim 11, wherein the first grip surface overlaps the cutting head with an entire length of the first grip surface.

13. The arrangement according to claim 1, wherein the hood, along the first grip surface, has clearance in relation to the cutting head, in the radial direction starting from the rotation axis.

14. The arrangement according to claim 1, further comprising a second grip surface on the cutting head, wherein the first grip surface of the hood and the second grip surface on the cutting head are freely accessible.

15. A portable work appliance comprising: a front housing; and an arrangement according to claim 1, wherein the outer region of the hood projects out of the front housing.

16. The work appliance according to claim 15, the front housing projects over the ribs of the hood in a direction of the rotation axis.

17. The arrangement according to claim 1, wherein the cutting head has a maximum outer diameter, wherein the first grip surface of the hood is at a distance from the rotational axis of the cutting head, wherein the distance corresponds to at least 30% of the maximum outer diameter of the cutting head.

18. The arrangement according to claim 1, wherein the hood has a maximum diameter that is at most 120% of a maximum diameter of the cutting head.

\* \* \* \* \*